United States Patent
Eccher et al.

(10) Patent No.: US 6,232,594 B1
(45) Date of Patent: May 15, 2001

(54) FEEDBACK CONTROL SYSTEM USING OPTICAL INCREMENTAL POSITION ENCODER WITH DUAL SINUSOIDAL INTENSITY PATTERNS

(75) Inventors: Joseph A Eccher, Loveland; Michael J Steinle, Ft Collins, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/338,232

(22) Filed: Jun. 22, 1999

(51) Int. Cl.[7] .................................................. G01D 5/34
(52) U.S. Cl. ................................ 250/231.14; 250/231.16
(58) Field of Search ........................ 250/231.14, 231.16, 250/231.18, 231.13, 566, 556, 237 G; 341/11, 9, 13

(56) References Cited

U.S. PATENT DOCUMENTS

| | | | |
|---|---|---|---|
| 4,472,629 | 9/1984 | Ort | 250/237 |
| 4,785,181 | 11/1988 | Kimizuka et al. | 250/237 |
| 5,691,824 | 11/1997 | Haded et al. | 358/487 |
| 5,696,609 | 12/1997 | Cresens et al. | 358/475 |
| 5,949,066 | * 9/1999 | Rice et al. | 250/231.13 |

OTHER PUBLICATIONS

W.C. Gibson, et al., "Pointing And Guidance Of The Buss Telescope", Proceedings of Society of Photo–Optic Instrumentation Engineers, vol. 28, pp. 249–260 (March, 1972).
Alfred F. Gort, "The Hewlett–Packard 3820A Electronic Total Station", Hewlett–Packard Product Marketing Literature 5952–9136, published approximately 1978, (Month Unknown).

* cited by examiner

*Primary Examiner*—Que T. Le
(74) *Attorney, Agent, or Firm*—Augustus W. Winfield

(57) ABSTRACT

A feedback control system has two sinusoidal quadrature position feedback signals generated by photosensitive detectors that sense light reflected from (or transmitted through) position encoding strips that have a reflectance (or transmissivity) that varies sinusoidally along the length of the strip. The system may have one position encoding strip, with two photosensors offset along the length of the strip to provide a ninety degree phase offset. Alternatively, the system may have two strips that are offset in phase by ninety degrees. An error signal is produced directly within the servo loop without requiring computation of ARC-SIN or ARC-COSINE. The error signal is continuous, and position error is not sensitive to photosensor gain.

4 Claims, 3 Drawing Sheets

FEEDBACK CONTROL SYSTEM USING OPTICAL INCREMENTAL POSITION ENCODER WITH DUAL SINUSOIDAL INTENSITY PATTERNS

FIELD OF INVENTION

This invention relates generally to feedback control systems, and more specifically to use of a unique optical encoder to sense position within a feedback control system.

BACKGROUND OF THE INVENTION

FIG. 1 illustrates a classic prior art feedback control system for controlling position. In FIG. 1, the system receives a position command 100. The command position is subtracted from the actual position by adder 102, generating a position error signal. The error signal is filtered by a compensation filter 104. The compensated error signal is received by a motor driver 106, which in turn drives a motor 108, which in turn causes some object to move. The actual position of the object being moved is measured by a position encoder 110, and the measured position is fed to adder 102.

Position encoders, as depicted in FIG. 1, 110, are used to generate an electronic signal that indicates an absolute mechanical position, or an incremental mechanical movement relative to a reference position. Rotary encoders and linear encoders are known. There are many known ways of generating a position signal, including magnetic sensors, capacitive sensors, and optical sensors. In a typical optical position encoder, a wheel or strip, having a scale or light mask comprising a series of rectangular openings with opaque areas between the openings, is mounted between a light source and a photodetector. As the wheel or strip is moved relative to the photodetector (or vice versa), the rectangular openings, and opaque areas between the openings, alternately transmit or block light to the photodetector. It is common to provide two scales, and two detectors, with the openings of one scale offset by half the width of an opening. The encoder then generates two binary quadrature signals. There are commercially available integrated circuits for generating position and direction signals from quadrature signals.

Depending on the relative sizes of the photodetectors and the openings in the scale, the signal from the photodetectors may be triangular or may be approximately sinusoidal. Typically, a triangular or sinusoidal signal is compared to a threshold by a comparitor circuit to generate a binary quadrature signal. For a binary quadrature signal, the resolution is typically one fourth of the pitch of the openings in the scale. Higher resolution may be obtained by measuring intermediate points along a triangular or sinusoidal signal. However, some techniques measuring intermediate points are sensitive to the amplitude of the sensor signal, and discontinuities may occur at encoder signal peaks.

One system has been described in which two sinusoidal signals are obtained and an analog error signal is generated without having to compute Arc-Sin and Arc-Cosine functions. In addition, the accuracy of the error signal is insensitive to sensor signal amplitude, and there are no discontinuities. See, William C. Gibson et al., "POINTING AND GUIDANCE OF THE BUSS TELESCOPE," Proceedings of the Society of Photo-optical Instrumentation Engineers, Volume 28, pp. 249–260, March 1972. The Buss telescope position control system generated position feedback signals using magnetometers sensing the earth's magnetic field. The control system used multiplying digital-to-analog converters, and operational amplifiers, to generate an analog error signal without having to compute Arc-Sin and Arc-Cosine functions.

A surveying instrument has been described, in which an encoder generates a single sinusoidal signal. However, the encoder is not used within a closed-loop control system. See, Alfred F. Gort, "THE HEWLETT-PACKARD 3820A ELECTRONIC TOTAL STATION," Hewlett-Packard product marketing literature, document number 5952–9136, published approximately 1978. In the angle encoder for the 3820A, a glass disc had a transparent area bounded by opaque metal film patterns, where the width of the transparent area varied sinusoidally. Photo-diodes, each wider than the widest part of the transparent area, generated an incremental sinusoidal angle position signal.

In systems where space is confined, or in systems in which the size of the photo-sensitive elements may be determined by factors unrelated to position sensing, an encoder as described for the 3820A surveying instrument may not be suitable because of the required width of the sinusoidal pattern. For example, an optical image scanner has been proposed in which a position encoding strip is sensed by elements of an array of photosensors. The array of photosensors is primarily used for image sensing, but some of the photosensors are dedicated to position sensing. An individual photosensor in an array of photosensors for a document scanner may, for example, sense an area having a width of 0.00167 inches (0.042 mm). If an encoding pattern is used as described for the 3820 surveying instrument, the pattern would have to be only a few tens of micrometers wide, or alternatively, many photosensor elements would have to be dedicated to sensing position. There is a need for a feedback system having the advantages of the general type of control system described for the Buss telescope, with precision sinusoidal incremental position encoding as described for the 3820 surveying system, but enabling use of small photosensor elements, and without requiring dedication of a large quantity of photosensor elements for position sensing.

SUMMARY OF THE INVENTION

A feedback control system has two sinusoidal quadrature position feedback signals generated by photosensitive detectors that sense light reflected from (or transmitted through) position encoding strips that have a reflectance (or transmissivity) that varies sinusoidally along the length of the strip. The system may have one position encoding strip, with two photosensors offset along the length of the strip to provide a ninety degree phase offset. Alternatively, the system may have two strips that are offset in phase by ninety degrees. An error signal is produced directly within the servo loop without requiring computation of ARC-SIN or ARC-COSINE. The error signal is continuous, and position error is not sensitive to photosensor gain.

DETAILED DESCRIPTION OF THE PREFERRED EMBODIMENT OF THE INVENTION

Figure 1:
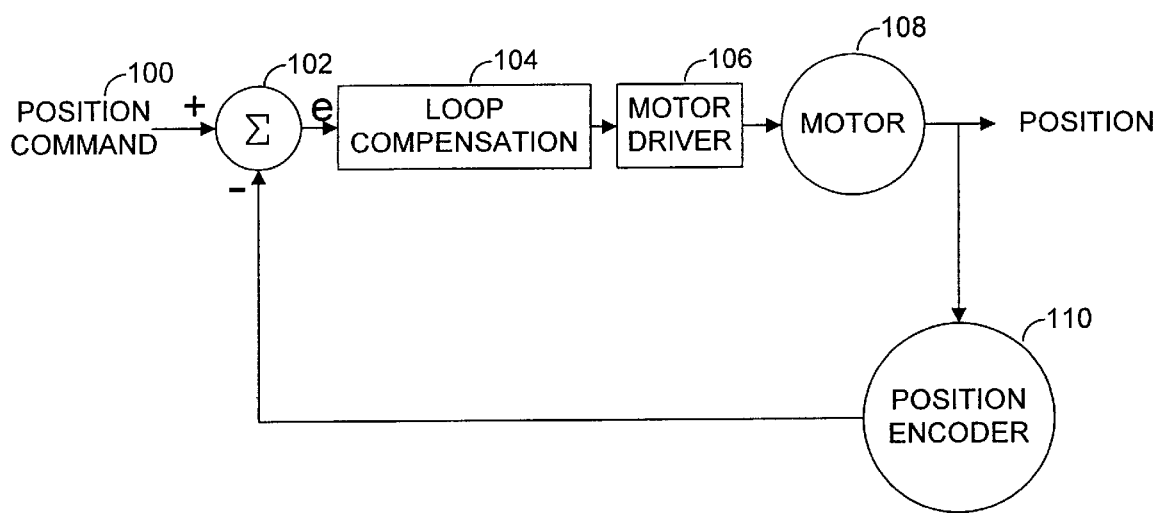
FIG. 1 (prior art) is a block diagram of an example basic control system.
Figure 2:
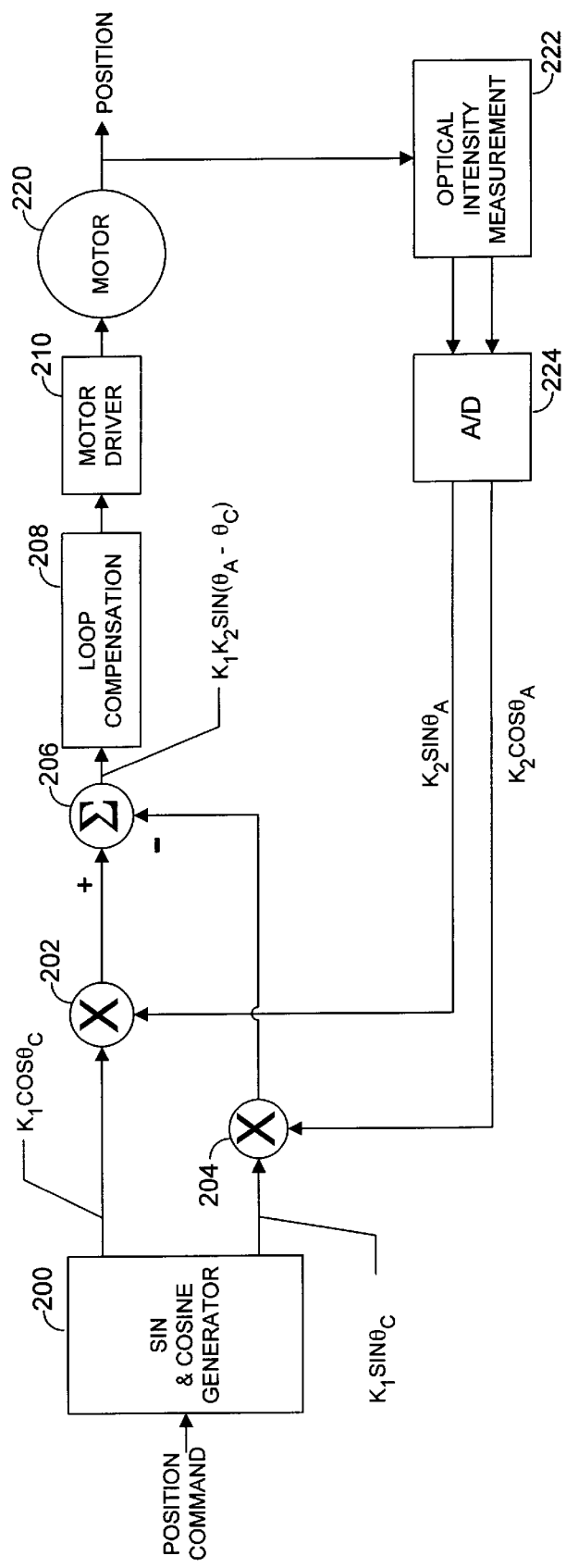
FIG. 2 is a block diagram of a control system in accordance with the invention.

FIG. 2 illustrates a control system in accordance with an example embodiment of the invention. A numeric position command is translated into a numeric phase $\theta_C$ from which numeric SIN and COSINE values are generated by a SIN and COSINE generator 200. As a result, a command position is represented by two values, $K_1 SIN\theta_C$ and $K_1 COS\theta_C$, where $K_1$ represents a gain factor for the command position. Two numeric sinusoidal actual position values ($K_2 SIN\theta_A$ and $K_2 COS\theta_A$) are provided, which will be discussed in more detail below. An error signal, $K_1 K_2 SIN(\theta_A-\theta_C)$ is computed as a result of the following equation:

$$K_1 K_2 SIN(\theta_A-\theta_C) = K_1 COS\theta_C * K_2 SIN\theta_A - K_1 SIN\theta_C * K_2 COS\theta_A$$

As illustrated in FIG. 2, the two command position values are multiplied by the two actual position values ($K_2 SIN\theta_A$ and $K_2 COS\theta_A$) by digital multipliers 202 and 204. The output of multiplier 204 is subtracted from the output of multiplier 202 by adder 206. The result is a sinusoidal error signal $K_1 K_2 SIN(\theta_A-\theta_C)$. The error signal is compensated by a loop compensation filter 208. The output of the compensation filter drives a motor driver 210, which in turn drives a motor 220. Motor 220 causes the position of an object to change. The position of the object is measured by an optical intensity measurement module 222. Analog position measurements are converted to digital values by an analog-to-digital converter 224.

Figure 3A:
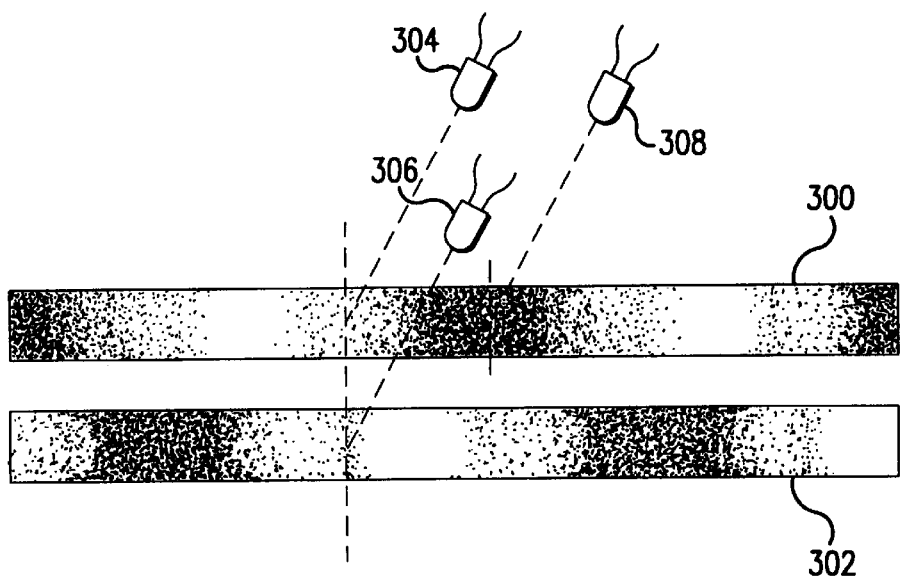
FIG. 3A is a plan view of two position encoding strips in accordance with the invention.
Figure 3B:
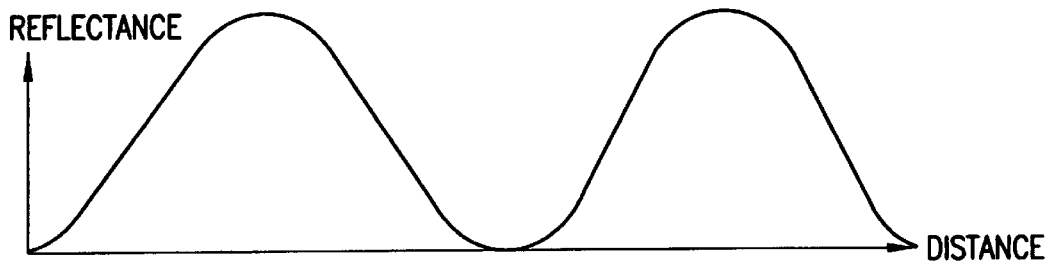
FIG. 3B is a line graph of the reflectance of one of the position encoding strips of FIG. 3A, as a function of length along the strip.
Figure 3C:
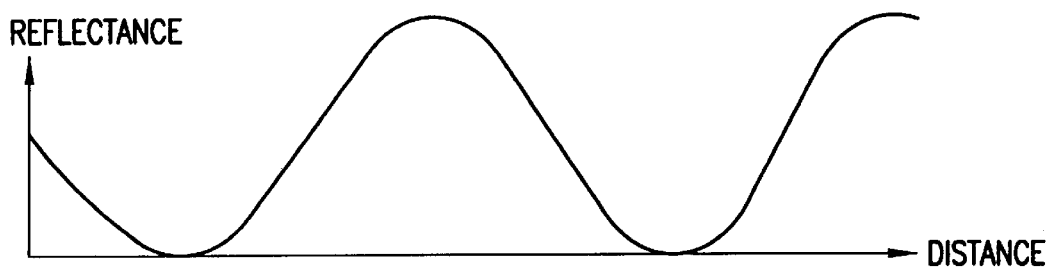
FIG. 3C is a line graph of the reflectance of one of the position encoding strips of FIG. 3A, as a function of length along the strip.

FIG. 3A illustrates part of the optical intensity measurement module 222. In FIG. 3A, position encoding strip 300 has a reflectance that varies sinusoidally along its length. FIG. 3B is a graph of the reflectance of encoding strip 300 as a function of distance along its length. In FIG. 3A, position encoding strip 302 has a reflectance that varies sinusoidally along its length. The phase of the sinusoidal density for strip 302 is shifted ninety degrees relative to the phase of the sinusoidal density for strip 300. FIG. 3C is a graph of the reflectance of encoding strip 302 as a function of distance along its length. Note that FIG. 3A is for illustration only, and the actual reflectances of strips 300 and 302 in FIG. 3A are not mathematically accurate. Likewise, FIGS. 3B and 3C are for illustration only, and the graphs may not be mathematically accurate. In FIG. 3A, photosensor 304 senses light reflected from encoding strip 300, and photosensor 306 senses light reflected from encoding strip 302. Photosensors 304 and 306 are aligned along the length of strips 300 and 302 so that the sinusoidal signals generated by the photosensors are ninety degrees out of phase. As an alternative embodiment, a single position encoding strip may be used, for example position encoding strip 300, and two photosensors may be offset along the length of the single encoding strip. For example, photosensors 304 and 308 each receive light reflected from encoding strip 300, and photosensors 304 and 308 are offset along the length of encoding strip 300 so that the signals generated are ninety degrees out of phase.

Position encoding strips may be linear as illustrated by position encoding strips 300 and 302 in FIG. 3A, or the position encoding strips may be circular on a rotary encoder. The photosensors may sense light reflected from position encoding strips, as illustrated in FIG. 3A, or the photosensors may sense light transmitted through position encoding strips.

In a specific example embodiment, an optical image scanner has an array of photosensors mounted on a moving carriage. As the carriage moves, the photosensors sequentially measure image lines. Two position encoding strips are placed so that at least two of the photosensors in the array of photosensors image the position encoding strips. Therefore, position sensing uses photosensors that are already part of the imaging system. The photosensor arrays are linear, so two encoding strips are used, with a ninety degree offset. An analog-to-digital converter is also part of the imaging system, so a separate analog-to-digital converter is not needed for position sensing. The imaging system also includes a processor that may be used for the multiplication and addition functions illustrated in FIG. 2. Therefore, the only incremental cost for implementing a closed loop system, as illustrated in FIG. 2, is the cost of a printed position encoding strip (two strips may be printed as one physical part). An example of a suitable linear frequency for the encoding strip is four cycles per inch (1.6 cycles per cm). A common maximum resolution for image scanning is 1,200 pixels per inch (47 pixels per mm), resulting in a need to be able to resolve 300 positions for each cycle of the encoding strip. In image scanners, a common resolution for an analog-to-digital converter is 12 bits, so that the intensity range for the encoding strip can be resolved to 4,096 gray levels, which is more than adequate to determine 300 positions per cycle.

For the specific example of an image scanner, an image scanner may have various calibration strips along the edges of the image being scanned. For example, calibration strips may be used for detecting changes in illumination intensity or changes in focal length. An image scanner may have a transparent platen used to hold a document for scanning, and calibration strips may be placed along opposite edges of the platen, just outside an image area, so that the calibration strips are continuously visible during scanning. Accordingly, position encoding strips as discussed above may be combined with calibration strips, and in particular, it may be preferable to have one position encoding strip along one edge of an image being scanned and a second position encoding strip (shifted ninety degrees in phase) along an opposite edge of the image being scanned.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A feedback control system comprising:
    a position encoding strip, the position encoding strip having a length and a width, wherein light intensity from the position encoding strip is modulated sinusoidally along the length of the position encoding strip, and wherein at any position along the length of the position encoding strip, light intensity is substantially uniform across the width of the position encoding strip; and
    a photosensor, measuring light intensity from the encoding strip.

2. The feedback control system of claim 1, the position encoding strip being a first position encoding strip and the photosensor being a first photosensor, the feedback control system further comprising:

a second position encoding strip, having a sinusoidal modulation of light along a length of the second position encoding strip, where the sinusoidal modulation of light for the second position encoding strip has a ninety degree phase offset relative to the sinusoidal modulation of light from the first position encoding strip; and a second photosensor, the second photosensor measuring light intensity from the second encoding strip.

3. The feedback control system of claim 2, used to control a moving photosensor array in an image scanner, the image scanner adapted to scan an image, the image having a first edge and a second edge, the first position encoding strip placed along the first edge and the second position encoding strip placed along the second edge.

4. The feedback control system of claim 1, the photosensor being a first photosensor, the feedback control system further comprising:

a second photosensor, the second photosensor offset along the length of the position encoding strip relative to the first photosensor so that the second photosensor receives light having a sinusoidal modulation that has a ninety degree phase offset relative to the sinusoidal modulation of light received by the first photosensor.

* * * * *